(No Model.)

A. B. ARNOLD.
SPRING FOR CARRIAGES.

No. 584,913. Patented June 22, 1897.

Witnesses:
W. J. Sankey,
R. S. Orwig.

Inventor: Alonzo B. Arnold,
By Thomas G. and J. Ralph Orwig,
Attorneys.

THE NORRIS PETERS CO., PHOTO-LITHO., WASHINGTON, D. C.

UNITED STATES PATENT OFFICE.

ALONZO B. ARNOLD, OF MARSHALLTOWN, IOWA, ASSIGNOR TO THE RHOADES-CARMEAN BUGGY COMPANY.

SPRING FOR CARRIAGES.

SPECIFICATION forming part of Letters Patent No. 584,913, dated June 22, 1897.

Application filed July 30, 1896. Serial No. 601,017. (No model.)

*To all whom it may concern:*

Be it known that I, ALONZO B. ARNOLD, a citizen of the United States of America, residing at Marshalltown, in the county of Marshall and State of Iowa, have invented a new and useful Improvement in Spring-Seated Vehicles, of which the following is a specification.

Heretofore convolute-spring braces have been combined with the parallel spring sidebars of a side-bar wagon and the side portions of the bottom of a wagon-box to coact in supporting the box. A single convolute-spring brace has also been attached to a wagon without a perch and a rocker on the front axle to extend parallel with two leaf-springs fixed to the same rocker and the flat bottom of the wagon, that served as a reach or perch.

My object is to connect spring-braces with the front and rear axles and the central portion of the body of a box or body supported upon elliptic springs that extend parallel with the axles to keep the elliptic springs perpendicular and to prevent the lurching motions incident to the body or box and persons seated thereon when the carriage is advanced on a rough road or over obstructions in the way of the wheels.

My invention consists in the arrangement and combination of spring-braces with the frame and rear portions of the running-gear of a four-wheeled vehicle and the body and box, as hereinafter set forth, pointed out in my claim, and illustrated in the accompanying drawings, in which—

Figure 1:
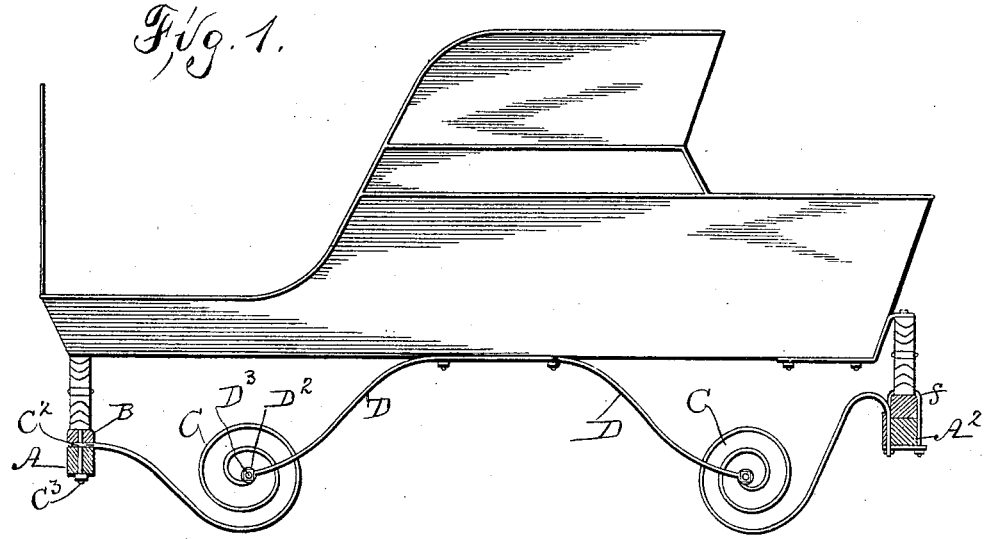
Figure 2:
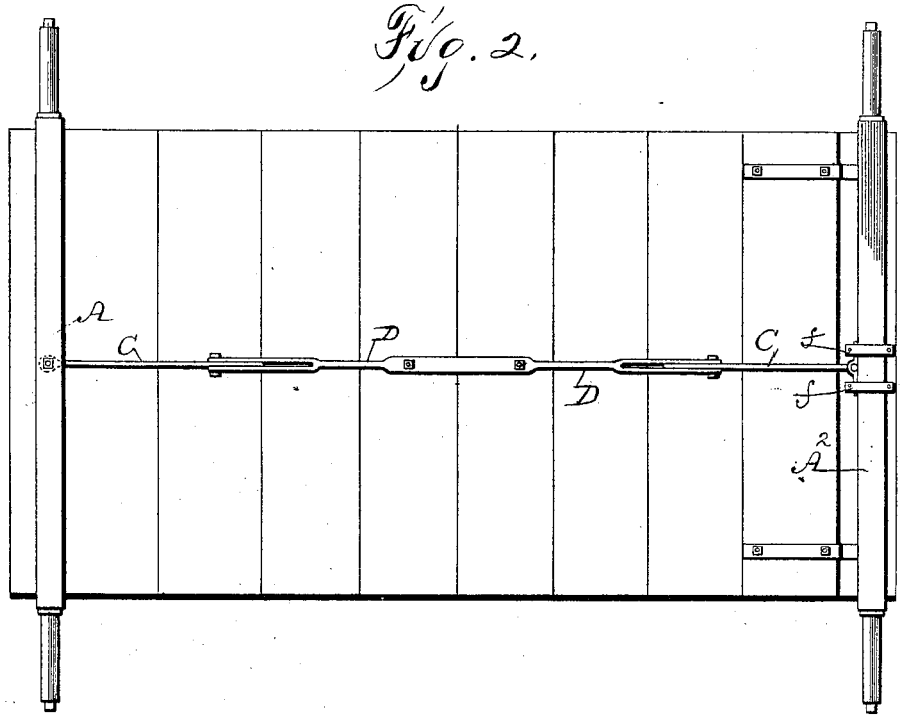

Figure 1 is a side elevation, and Fig. 2 a bottom view, of a carriage, showing the construction and application of my invention.

The letter A designates the front axle of a vehicle, and B the bolster or spring-bar on top of the axle.

C is a convolute spring made of a steel rod and provided with an eye $C^2$ in its front end, through which a ring-bolt $C^3$ is passed to connect it with the front axle.

D is a duplex brace adapted at its central portion to be fixed to the central portion of the under side of the body or box of the vehicle by means of screws or rivets. The end portions incline downward and are bifurcated, and the end of each branch at each end of the brace terminates in an eye $D^2$. Rivets or bolts $D^3$ are passed through the coinciding eyes $D^2$ of the duplex brace and the eyes $C^2$ of the springs C to pivotally connect said springs with the bifurcated ends of said brace in such a manner that the coils of the springs will be kept in the same vertical plane by the branches of the bifurcated ends of the duplex brace, as required to prevent torsional pressure and strain of the springs.

The rear end of the spring connected with the rear axle $A^2$ terminates in a straight and flat downward extension adapted to be clamped fast to the rear axle by means of U-shaped bolts $f$ or fixed thereto in any suitable way, so that the complete duplex spring will extend from the front axle to the rear axle to serve as a yielding self-adjusting support for the central part of the carriage body or box to prevent the forward-and-backward motions of the box or body of the vehicle and to retain the elliptic springs in perpendicular planes above the axles, as required to prevent the torsional straining to which they would otherwise be subjected, and to aid in maintaining the person or persons upon the seat in equilibrium while the vehicle is passing over uneven ground or obstructions that would otherwise cause danger and discomfort to the passengers on the seat.

Having thus described the construction, application, and function of my invention, I claim as new and useful and desire to secure by Letters Patent—

In a four-wheeled vehicle, the combination of a duplex brace having bifurcated ends and the branches of each end provided with coinciding eyes and the central portion fixed to the central and under part of the body or box, a convolute spring provided with an eye at its inner end and connected with the front end of the duplex brace by means of a bolt and the front end of the same spring provided with an eye and connected with the front axle by means of a king-bolt and a second convolute spring provided with an eye at its inner end and connected with the rear end of the duplex brace by means of a bolt and fixed at its rear end to the rear axle, and elliptic springs mounted upon the axles in parallel planes therewith to support a box or body in the manner set forth for the purposes stated.

ALONZO B. ARNOLD.

Witnesses:
W. H. H. BOWEN,
J. A. WRIGHT.